L. A. CORNELIUS.
TANK VALVE BALL.
APPLICATION FILED OCT. 25, 1909.
1,001,621.
Patented Aug. 29, 1911.
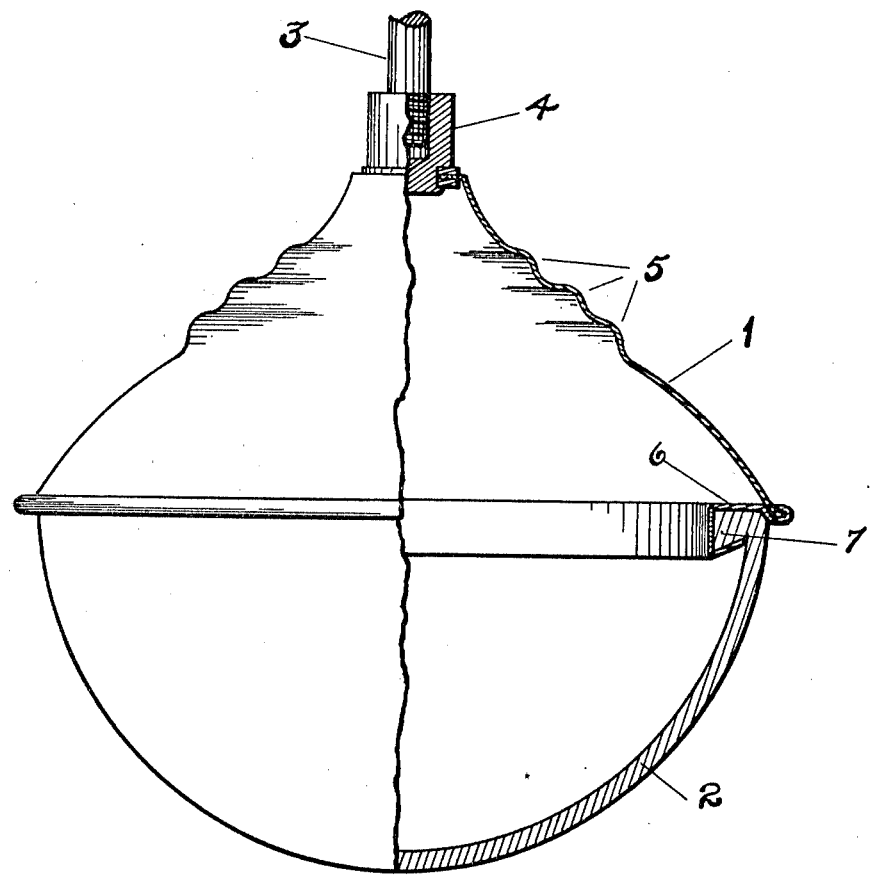
WITNESSES
Charles W. Pake.
Mary S. Tooker
INVENTOR
Louis A. Cornelius
BY
Edward Taggart ATTORNEY

UNITED STATES PATENT OFFICE.

LOUIS A. CORNELIUS, OF GRAND RAPIDS, MICHIGAN.

TANK-VALVE BALL.

1,001,621.  Specification of Letters Patent.  Patented Aug. 29, 1911.

Application filed October 25, 1909. Serial No. 524,347.

*To all whom it may concern:*

Be it known that I, LOUIS A. CORNELIUS, a citizen of the United States, residing at Grand Rapids, in the county of Kent and State of Michigan, have invented new and useful Improvements in Tank-Valve Balls, of which the following is a specification.

My invention relates to a tank valve ball adapted especially for controlling the outlet valve in closet tanks. Its purpose is to provide a desirable combination of simplicity and economy in manufacture, with strength, lightness and efficiency in use. I accomplish this by the form of construction shown in the accompanying drawing, in which one-half of the figure shows in perspective the finished valve ball, while the other half is cut away to show the same parts in cross-section.

It is necessary that valves of this kind should be light enough to float positively and flexible enough to seat themselves and to be held firmly by suction in the valve opening, because only by such flexibility can the necessity be avoided for impractical perfection of fit. Balls composed entirely of rubber and composed entirely of metal have been used, and balls have also been constructed composed partly of rubber and partly of metal. I aim to avoid difficulties and weaknesses and objections in this last class of such balls.

In the drawing 1 represents the upper or metal half of the ball, and 2 the lower or rubber half thereof. This valve is manually operated by a valve stem 3, which may be screwed into, or otherwise inserted in a suitable way, in the lug, or cap, 4. The upper part of the ball is struck up from light brass, or other suitable metal, in substantially semi-spherical form, open at the bottom and is stiffened by the horizontal corrugations 5, of any suitable form. When this portion of the ball is made of metal sufficiently light so as not to interfere with the floating capacity of the ball, there is difficulty in making a sufficiently firm connection with the upper edge of the rubber half of the ball. The metal may be turned over to engage a flange on the rubber ball, but the metal being so very light, and having to be turned over a large flange of flexible material, it is likely to be distorted and pulled out of shape, permitting the water to enter the ball and interfere with its operation. I avoid this difficulty by using a separate annular flange of the form shown in cross-section by 6. This separate flange may be made of heavier metal, as stiff as may be found necessary, without adding too much weight to the ball. The upper and outer edge of this separate flange may be turned over to engage the lower edge of the metallic half of the ball and the inner, downwardly-extending portion of the annular flange may be turned up, as shown, to engage the flange 7, which flange is on the upper edge of the rubber half of the ball. In this manner I make complete and satisfactory engagement between the two parts of the ball, stiffen the ball as much as is necessary at its center to prevent accidental or undue distortion, leave the lower half sufficiently flexible, and produce a device which is very efficient and extremely simple and economical in the process of its manufacture.

Having thus described my invention, what I claim to have invented, and desire to secure by Letters Patent, is—

1. A hollow air-tight valve ball comprising a metal portion having an annular flange, a rubber portion having an annular flange, and an annular metal connecting member for said portions, of separate piece therefrom, and having a flange turned over and embracing the metal portion's flange, and another flange embracing the rubber portion's flange and turned in the direction opposite to that in which the member's first flange is turned, such member in transverse section thus assuming the shape of a distorted letter S.

2. A hollow air-tight valve ball comprising cup-shaped portions, and an annular connecting member for said portions, of separate piece therefrom, and having a flange embracing the peripheral edge of one said portion and another flange embracing the peripheral edge of the other said portion and turned in the direction opposite to that in which the member's first flange is turned, such member in transverse section thus assuming the shape of a distorted letter S.

3. A hollow air-tight valve ball comprising a metal portion having an outwardly-extending annular flange, a rubber portion having an inwardly-extending annular flange, and an annular metal connecting member for said portions, of separate piece therefrom, and having a flange turned over and embracing the metal portion's flange, and another flange turned over and embracing the rubber portion's flange.

In testimony whereof I have hereunto set my hand in presence of two subscribing witnesses.

LOUIS A. CORNELIUS.

Witnesses:
　MARY S. TOOKER,
　MARY SCHULTE.